(12) United States Patent
Doten

(10) Patent No.: US 9,908,622 B2
(45) Date of Patent: Mar. 6, 2018

(54) ONBOARD POLYMER GEL PREPARATION SYSTEM FOR AIRCRAFT WITH SNORKEL INTAKE

(71) Applicant: Leonard E. Doten, Cold Springs, CA (US)

(72) Inventor: Leonard E. Doten, Cold Springs, CA (US)

( * ) Notice: Subject to any disclaimer, the term of this patent is extended or adjusted under 35 U.S.C. 154(b) by 0 days.

(21) Appl. No.: 14/616,271

(22) Filed: Feb. 6, 2015

(65) Prior Publication Data

US 2016/0229535 A1  Aug. 11, 2016
US 2017/0183098 A9  Jun. 29, 2017

Related U.S. Application Data

(63) Continuation-in-part of application No. 12/660,044, filed on Feb. 19, 2010, now Pat. No. 9,192,797.

(51) Int. Cl.
*B64D 1/22* (2006.01)
*A62D 1/00* (2006.01)
*B64D 1/16* (2006.01)

(52) U.S. Cl.
CPC ............. *B64D 1/22* (2013.01); *A62D 1/0064* (2013.01); *B64D 1/16* (2013.01)

(58) Field of Classification Search
CPC ................................ B64D 1/22; A62D 1/0064
USPC ...................................... 169/44, 53; 239/127
See application file for complete search history.

(56) References Cited

U.S. PATENT DOCUMENTS

| | | | |
|---|---|---|---|
| 2,722,456 A * | 11/1955 | Glessner | A01M 13/00 239/127 |
| 3,442,334 A | 5/1969 | Gousetis | |
| 4,979,571 A * | 12/1990 | MacDonald | A62C 3/0242 169/14 |
| 6,003,782 A | 12/1999 | Kim | |
| 6,209,593 B1 * | 4/2001 | Nichols, Sr. | B64D 1/16 141/2 |
| 6,644,595 B2 * | 11/2003 | Ramage | B64D 1/22 169/53 |
| 2006/0175429 A1 * | 8/2006 | Lanigan, Jr. | B64D 1/16 239/171 |
| 2011/0203812 A1 * | 8/2011 | Doten | A62C 3/0235 169/44 |
| 2013/0056230 A1 | 3/2013 | Lemke | |
| 2013/0112907 A1 * | 5/2013 | Doten | B01F 5/0415 252/2 |
| 2014/0124223 A1 | 5/2014 | Solomon | |

* cited by examiner

*Primary Examiner* — Arthur O Hall
*Assistant Examiner* — Chee-Chong Lee
(74) *Attorney, Agent, or Firm* — Heisler & Associates

(57) ABSTRACT

The system includes a snorkel leading from an intake up to a tank borne by an aircraft. A feed pump in the intake draws water up the snorkel to the tank. A polymer gel emulsion reservoir supplies polymer gel upstream of the feed pump for addition and activation of the polymer gel emulsion with the water. A separate pump within the tank provides for selectable recirculation within the tank and/or discharge out of the tank, such as out of a nozzle. Polymer gel emulsion can optionally be supplied at the tank pump rather than the feed pump for delayed addition of polymer gel emulsion to water carried by the aircraft.

13 Claims, 5 Drawing Sheets

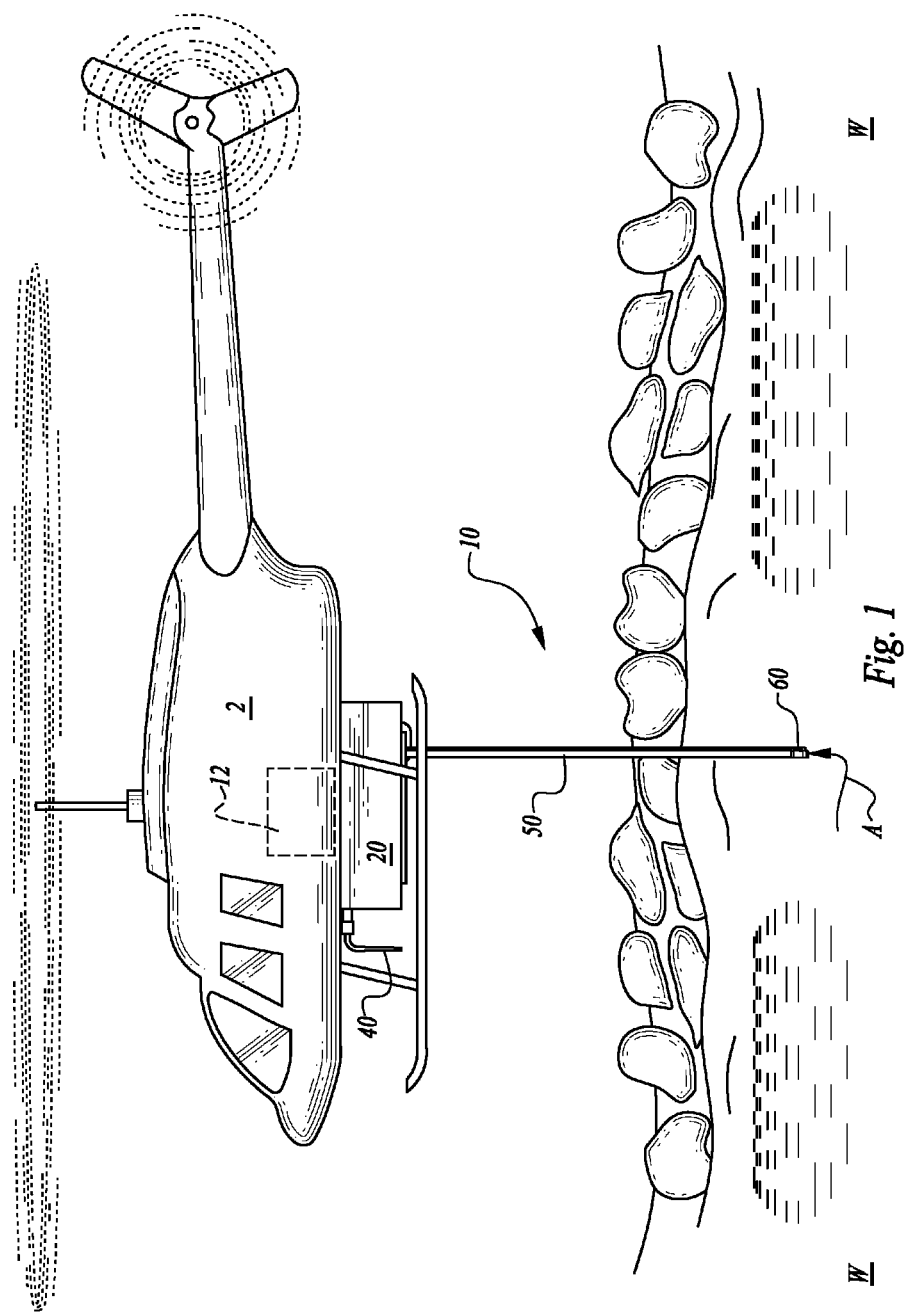

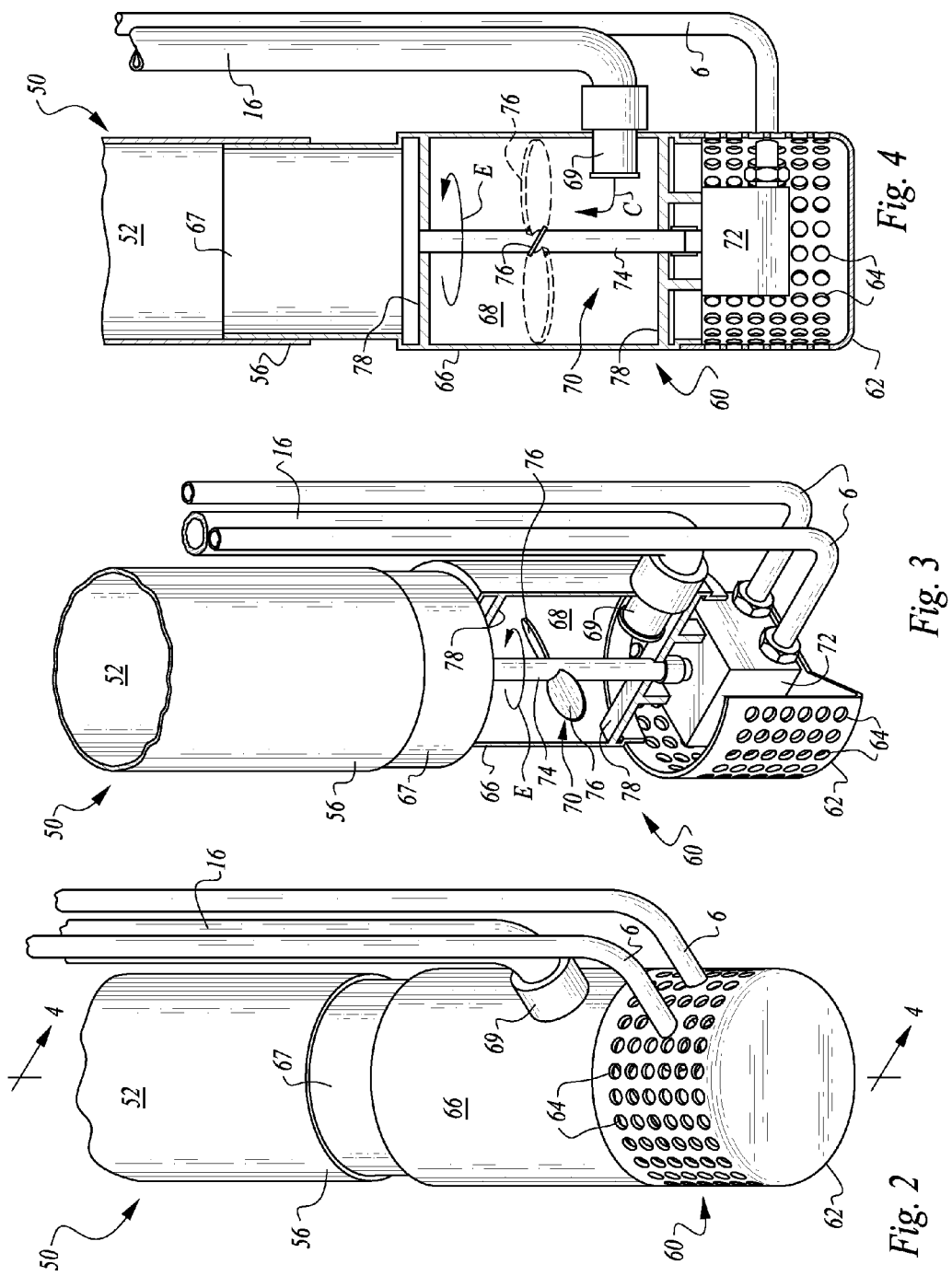

ONBOARD POLYMER GEL PREPARATION SYSTEM FOR AIRCRAFT WITH SNORKEL INTAKE

FIELD OF THE INVENTION

The following invention relates to fire fighting aircraft and systems for adding and preparing fire fighting additives, such as polymer gel emulsion, to water before delivery from the aircraft. More particularly, this invention relates to aircraft with snorkel intakes and a tank borne by the vehicle for storing water with or without polymer gel emulsion prepared for delivery, such as from dump doors in the tank or a discharge nozzle.

BACKGROUND OF THE INVENTION

When combating wildfire from the air, various tools can be utilized. One common tool is to load an appropriately configured aircraft with water or wildland fire chemicals, fly the aircraft over the fire or an area adjacent the fire to be protected, and discharge the fire chemical or water from the aircraft. While fire chemicals are quite effective in suppressing wildfire, the aircraft must travel to a reloading base and return to the location of the wildfire before additional loads can be dropped, decreasing the effectiveness of such aircraft proportional to the distance the reloading base is from the fire and the time such reloading takes.

In many instances bodies of water are available in the area where the wildfire is occurring. Helicopters can be utilized with buckets suspended therefrom which can be loaded with water and then flown to the site of the wildfire and released. Helicopters and other rotary wing aircraft are also known to have a fixed tank thereon for fire chemical or water. One filling method for such fixed tanks is to utilize a snorkel extending down from the tank with a pump at the lower end to allow the tank to be filled from bodies of water close to the fire. Water is not as effective as fire retardants, suppressants or other fire chemicals in combating wildfire. Also, helicopters generally have a lesser payload capacity than airplanes.

Water's effectiveness as a fire suppressant can be significantly enhanced by adding a suppressant polymer to the water. One such polymer material is provided under the trademarks FIREWALL ULTRA, provided by BroadRange Wildland Fire Chemicals of Cold Springs, Calif. and FIREWALL II, provided by Eco FireSolutions of Carmichael, Calif. One unique characteristic of such polymer material is that merely adding the polymer material to water does not provide the full benefit of fire suppressant capacity to the water. Rather, the polymer must be both activated and thoroughly mixed with the water. Shearing forces cause the water to have the polymer fully activated as a first part of the polymer preparation process, so that the fire suppressant effect of the water can be maximized. A second part of the preparation process is mixing to distribute the activated polymer throughout the water load. A pump is typically used which provides the required shearing/mixing force to activate the polymer.

In some instances a fire fighting aircraft with a tank may benefit from first taking on a load of water and later, at the option of the operator, having polymer gel emulsion added to the water within the tank and activated and mixed with the water shortly before the water and polymer gel emulsion are to be dropped. With such a delayed addition of polymer gel emulsion to water within the tank, along with activation and mixing thereof, an operator has the opportunity to take on a load of water in a first step and not have the polymer gel emulsion immediately added thereto. Then, should the load of water not be needed for firefighting, the polymer gel emulsion has not been wasted and the water can be dropped without concern for polymer release into the environment. Furthermore, should an operator determine that polymer gel emulsion is not needed, water can be dropped without polymer gel emulsion. Furthermore, an operator can determine shortly before dropping water with polymer gel emulsion how much polymer gel emulsion to add to the water.

SUMMARY OF THE INVENTION

With this invention a system is provided for loading a tank borne by an aircraft with water and for supplying and preparing a fire fighting additive, such as polymer gel emulsion, so that it can be delivered from the tank at an area to be treated in fighting fire. The system includes a tank borne by the aircraft for containing the water, as well as a reservoir for fire fighting additive, such as polymer gel emulsion. A snorkel extends down from the tank and is provided for filling of the tank with water. An intake is located at a lower end of the snorkel, which intake can be dropped into a body of water, so that the water can be delivered up into the tank. A feed pump is provided adjacent the intake which provides the power to deliver the water up the snorkel and into the tank. The tank includes dump doors in a preferred embodiment to provide one water exit from the tank. A most preferred water exit for the tank, however, is a discharge including a nozzle extending substantially downwardly from the tank which produces a focused spray of water to an area to be treated beneath the vehicle.

At least one port is provided for supplying fire fighting additive, such as polymer gel emulsion into the water. A first optional location for this port is upstream of the feed pump adjacent the intake of the snorkel. Polymer gel emulsion must be activated by sheering in the presence of the water so that the polymer gel emulsion can be most effective in treating an area in the fighting of a fire. By supplying the polymer gel upstream of the feed pump, an impeller of the pump itself can sheer the polymer gel as the water is also being pumped so that downstream of the pump and up through the snorkel a supply of water with activated polymer gel emulsion is supplied, up the snorkel and into the tank.

A second optional location for the port (provided alone or in combination with the port upstream of the feed pump) is a port within the tank. Most preferably the tank includes a separate pump within the tank. This tank pump serves the dual purposes of recirculating/mixing water and polymer gel emulsion within the tank, and also energizing the water and polymer gel emulsion for maximum effectiveness when being delivered from the tank through the nozzle or other discharge. The tank pump has an inlet within a lower portion of the tank with the tank port located between the pump inlet and the tank pump. In this way, an impeller within the tank pump can sheer the polymer gel emulsion along with the water for full activation of the polymer gel emulsion within the water.

To allow the tank pump to both act to recirculate water within the tank and supply a discharge from the tank, a valve is provided on an outlet of the pump. This valve includes an inlet downstream from the pump and two outlets which can be selectively aligned with the pump for fluid flow from the pump. A first pathway from this valve leads to a manifold within the tank which has multiple separate jets therein for return of pressurized water and polymer gel emulsion within the tank, such as to keep the polymer gel emulsion activated and substantially evenly distributed within water contained within the tank. The second selectable pathway through the valve leads to a discharge assembly including a water exit from the tank in the form of a nozzle. This nozzle is pointed substantially downward in a preferred embodiment and is supplied with energized water from the tank pump for delivery of water and polymer gel emulsion in a focused fan down to an area beneath the aircraft to be treated with water and polymer gel emulsion.

OBJECTS OF THE INVENTION

Accordingly, a primary object of the present invention is to provide a system for loading of an aircraft with water and supplying a fire fighting additive, such as polymer gel emulsion, to the water before delivery at a fire fighting location.

Another object of the present invention is to provide an aircraft which can fight fire more effectively than aircraft utilizing water only.

Another object of the present invention is to provide a fire fighting aircraft which can selectively deliver either just water or water along with a fire fighting additive.

Another object of the present invention is to provide a fire fighting aircraft which can take on a load of water in a first operation and later add polymer gel emulsion or other fire fighting additive to the water in a second operation before discharge of the water at a fire fighting location.

Another object of the present invention is to provide a fire fighting aircraft which is both highly effective in fighting fires and provides a high degree of control of the extent to which fire fighting additives are discharged into the environment.

Another object of the present invention is to provide a method for loading water and fire fighting additive such as polymer gel onto an aircraft and for preparing the water and fire fighting additive for discharge and for discharging the water in a highly effective manner.

Another object of the present invention is to provide a fire fighting aircraft which can deliver water, with or without fire fighting additive, in a highly controlled manner.

Another object of the present invention is to provide a water intake and onboard polymer gel preparation system coupleable to an aircraft.

Other further objects of the present invention will become apparent from a careful reading of the included drawing figures, the claims and detailed description of the invention.

BRIEF DESCRIPTION OF THE DRAWINGS

FIG. 1 is a side elevation view of an aircraft configured with the onboard polymer gel preparation system of this invention and shown in the process of having water drawn up into the tank borne by the aircraft.

FIG. 2 is a perspective view of an intake at a lower end of a snorkel of the system.

FIG. 3 is a perspective view of that which is shown in FIG. 2 viewed from a separate point of view as that of FIG. 2 and with outer portions of the intake cut away to reveal interior details.

FIG. 4 is a sectional view of that which is shown in FIG. 2, taken along lines 4-4 of FIG. 2.

DESCRIPTION OF THE PREFERRED EMBODIMENT

Figure 5:
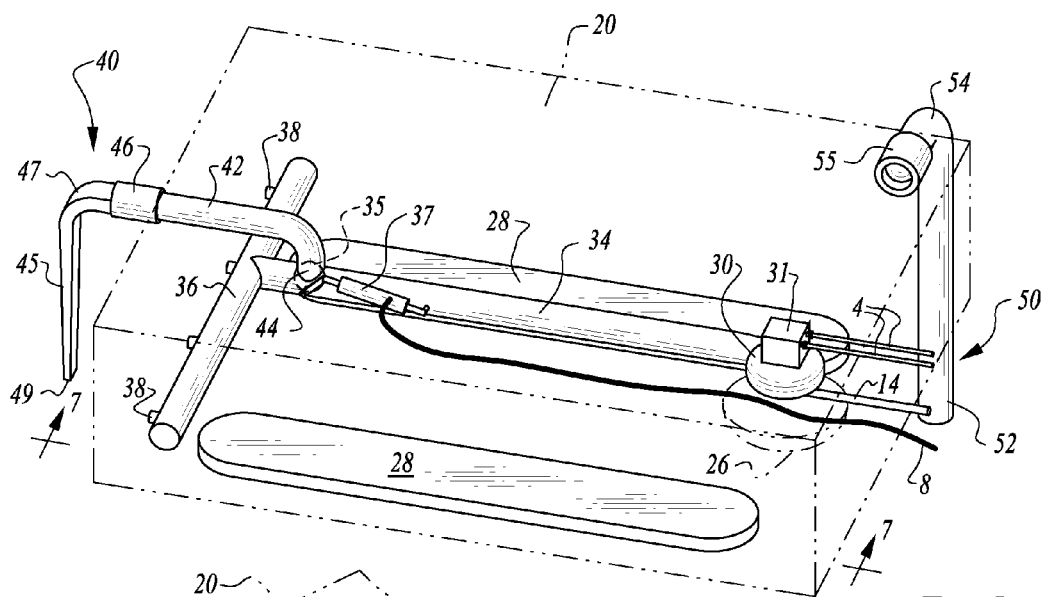
FIG. 5 is a perspective view of the water tank borne by the aircraft and with a tank enclosure shown in broken lines so that fluid handling equipment leading to the tank, located within the tank and provided for delivery of water from the tank, can all be clearly seen.
Figure 6:
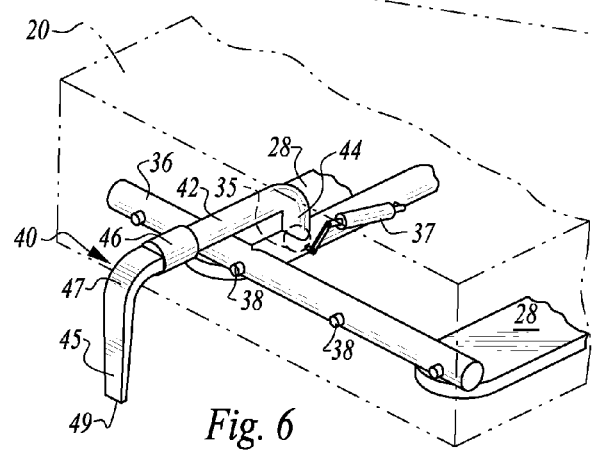
FIG. 6 is an end perspective view of that which is shown in FIG. 5.
Figure 7:
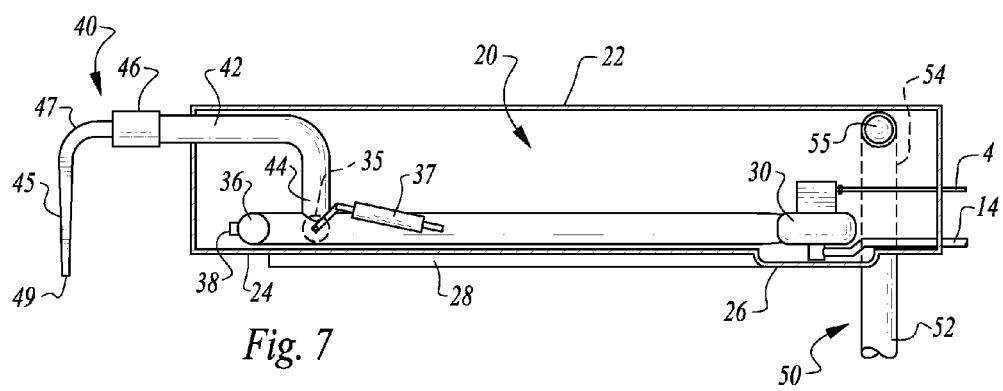
FIG. 7 is a full sectional front elevation view of that which is shown in FIG. 5, and with the tank enclosure shown in solid lines, further illustrating how water handling equipment within and adjacent the tank is configured in a preferred embodiment.

Referring to the drawings, wherein like reference numerals represent like parts throughout the various drawing figures, reference numeral 10 is directed to a system for utilizing a snorkel 50 with intake 60 to deliver water W into a tank 20 borne by an aircraft 2 and to control the addition and preparation of fire fighting additive, such as polymer gel emulsion, to water W within the tank 20 before delivery therefrom. The system 10 allows the tank 20 to be filled with water W with or without the addition and preparation of fire fighting additive initially, and for separate later optional addition of fire fighting additive. The system 10 is also configured to activate the additive, such as polymer gel emulsion, and to maintain the combination in a well mixed state, as well as separate control of discharge of the water W (with or without fire fighting additive) from an exit, such as a discharge 40 including a nozzle 45 or dump doors 28.

Figure 12:
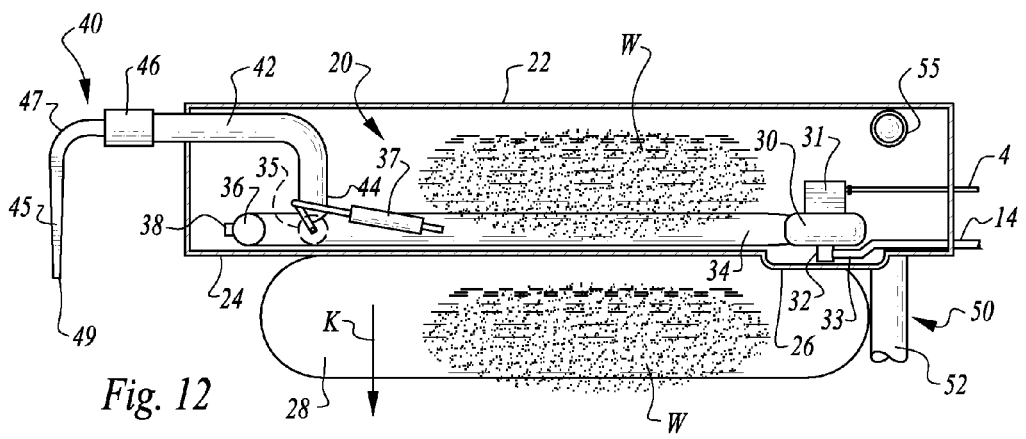
FIG. 12 is a side elevation view similar to that which is shown in FIG. 7, but with the dump door of the tank opened for delivery of water (with or without fire fighting additive, such as polymer gel emulsion) from the tank.

In essence, and with particular reference to FIGS. 1, 4, 8 and 9, basic details of the system 10 of this invention are described, according to a most preferred embodiment. Various components of the system 10 are borne by an aircraft 2, such as a helicopter. This equipment includes a tank 20 typically fixed to the aircraft 2 and with a polymer gel emulsion reservoir 12 also borne by the aircraft 2. A pump 30 (FIG. 9) is optionally located within the tank 20 both for recirculation within the tank 20 and to allow for pressurized delivery of water W from the tank 20, either from a discharge 40 leading to a water W exit such as a nozzle 45 or with the pump 30 merely providing mixing and activation of polymer gel within the tank 20 before delivery through dump doors 28 on the tank 20 (FIG. 12). A valve 35 downstream of the pump 30 within the tank 20 allows for selective control of the pump 30 to either cause the pump 30 to produce recirculation within the tank 20, as well as selectively to provide input of polymer gel emulsion and activation of the polymer gel emulsion within the water W, or to selectively provide energized water (with or without fire fighting additive) flow from the tank 20, through the discharge 40, preferably including the nozzle 45.

Water W is supplied into the tank 20 by being drawn up through a snorkel 50 extending down from the tank 20. An intake 60 is provided at a lower end 56 of the snorkel 50 opposite an upper end 54 of the snorkel 50 adjacent the tank 20. The intake 60 includes a feed pump 70 adjacent thereto. The intake 60 can be lowered into a body of water W (FIG. 1) and the feed pump 70 activated to draw water up into the snorkel 50 and up to the tank 20. A snorkel port 69 upstream of the feed pump 70 allows for addition of polymer gel emulsion upstream of the feed pump 70, so that sheer associated with the pumping of the water W within the feed pump 70 also causes activation of the polymer gel emulsion with the water W, so that the water W has activated polymer gel emulsion contained therein as it travels up the snorkel 50 and into the tank 20. Optionally, this snorkel port 69 can be omitted or selectively not used so that water without polymer gel emulsion can be drawn into the tank 20, and a tank port 33 upstream of the pump 30 within the tank 20 can later be utilized for addition of the polymer gel emulsion and activation thereof within the tank 20, when desired by an operator.

Figure 8:
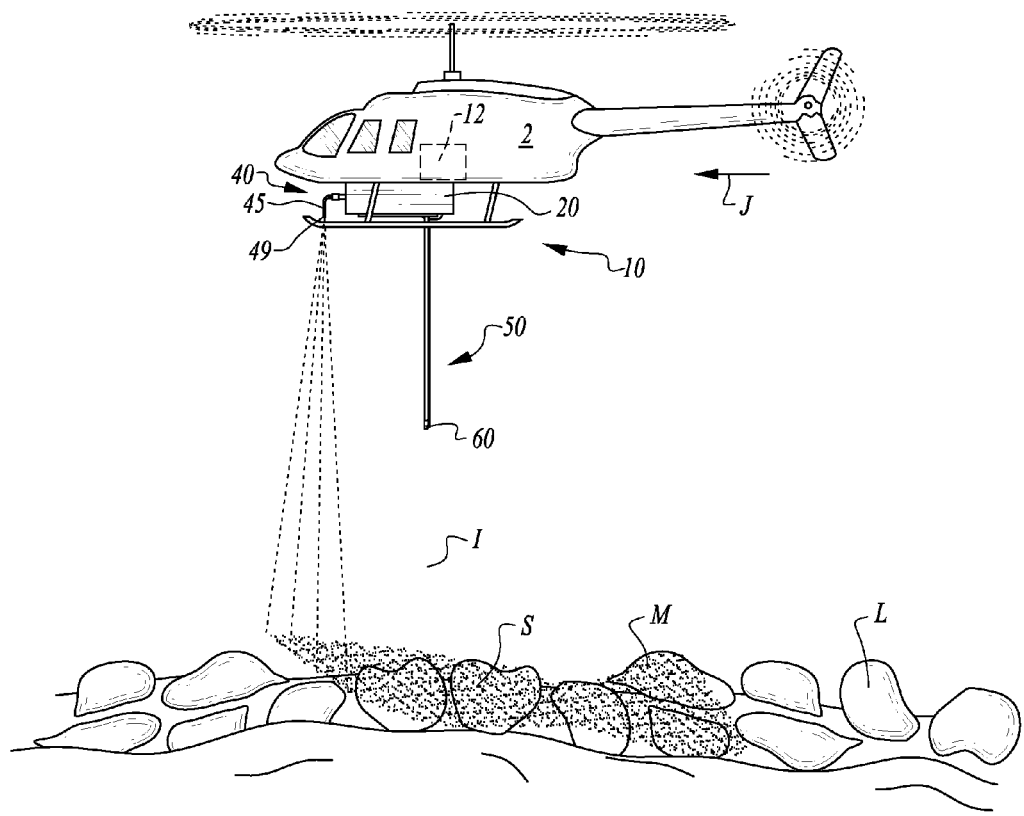
FIG. 8 is a side elevation view of an aircraft such as that depicted in FIG. 1 after it has been loaded with water and is delivering a spray of water (with or without fire fighting additive) to an area to be protected by wildfire.
Figure 9:
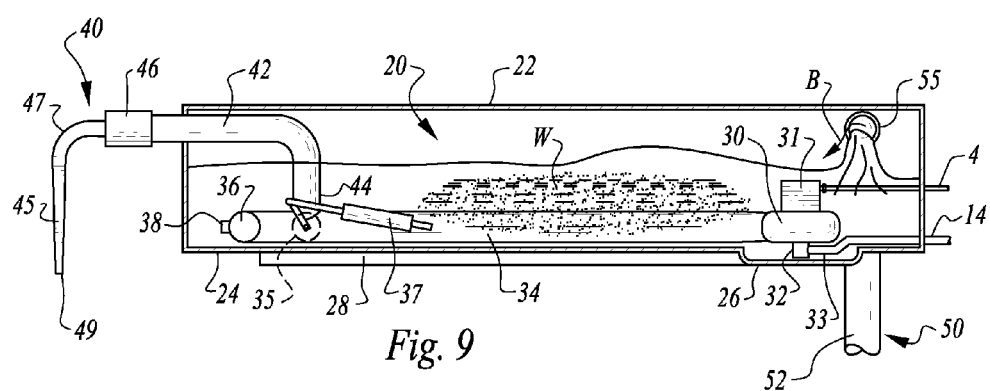
FIG. 9 is a full sectional view similar to that which is shown in FIG. 7, but with the tank shown in the process of being filled with water.

More specifically, and with particular reference to FIGS. 1 and 8, specific details of the aircraft 2 which would typically be utilized with the system 10 of this invention is described for reference in describing the preferred embodiment. The aircraft 2 could be any of a variety of different flying vehicles, but is most preferably in the form of a helicopter or other rotary wing aircraft. While the aircraft 2 is shown in one configuration, aircraft having other configurations could similarly support the system 10. The aircraft 2 has sufficient excess power and lift capacity to allow for the tank 20 substantially full of liquid to be carried, as well as the weight of a polymer gel emulsion reservoir 12 or other container for fire fighting additive.

Also, the aircraft 2 benefits from having hydraulics or other control equipment which can be interfaced by the system 10, both to power the pumps 30, 70 of the system 10 and so that an operator on the aircraft 2 can utilize controls on the aircraft 2 which have been integrated with the system 10 for controlling various different operational aspects of the system 10. The aircraft 2 preferably has skids or other legs extending downward therefrom sufficiently far so that the tank 20 and discharge 40 including the nozzle 45 can be carried beneath a cabin or other frame structure of the aircraft 2 and be elevated above ground when the aircraft 2 is resting on the ground, but with the snorkel 50, formed of a flexible uptake conduit 52, able to flex when coming into contact with the ground beneath the aircraft 2.

The polymer gel emulsion reservoir 12 includes a pair of supply lines including a supply line 14 leading to the tank 20 and a supply line 16, leading to the snorkel 50 intake 60. The supply lines 14, 16 deliver polymer gel emulsion from the reservoir 12 to water W handled within the system 10 in accordance with desired operations of the system 10 under control of the operator.

Hydraulic lines preferably lead from the aircraft 2 to the tank along the hydraulic line 4 for powering of the pump 30 within the tank 20. Also, hydraulic lines 6 lead from the aircraft 2 down to the snorkel 50 intake 60 for powering of the feed pump 70. While hydraulics are a preferred form of power for the pumps 30, 70, one or both of the pumps 30, 70 could be powered electrically with the hydraulic lines 4, 6 replaced with electric power conduits. These pumps 30, 70 could also conceivably be powered pneumatically or through some form of mechanical linkage or other power transfer, which preferably originates from the aircraft 2, but could be provided from a separate power unit or units, such as conceivably power plants integrated into each pump 30, 70 or other convenient configuration.

With particular reference to FIGS. 1-4, details of the snorkel 50 are described, according to this preferred embodiment. The snorkel 50 is an elongate flexible structure with a hollow uptake conduit 52 extending from an upper end 54 to a lower end 56. The upper end 54 is coupled to the tank 20 through a tank input 55 which preferably includes a check valve thereon. The check valve at the input 55 ensures that water flow up the conduit 52 of the snorkel 50 can feed water W into the tank 20, but is prevented from having water W extend back down the snorkel 50.

The uptake conduit 52 is flexible so that the snorkel 50 can either be folded up under the aircraft 2 or dangle vertically down from the aircraft 2. The uptake conduit 52 of the snorkel 50 is preferably sufficiently long so that the lower end 56 can be located within a body of water W while the aircraft 2 remains a safe distance above the body of water W (FIG. 1). The snorkel 50 is particularly useful when water is to be loaded onto the aircraft 2 from a body of water W which is not sufficiently deep for a bucket to drop into the body of water W and scoop up a load of water W.

An intake 60 is located adjacent the lower end 56 for input of water W into the snorkel 50 and up to the tank 20. This intake 60 includes a lower cover 62 which acts as a screen with entry holes 64 therein for passage of water into the intake 60. The intake 60 is preferably surrounded by a generally cylindrical housing 66 with an upper sleeve 67 coupleable to the lower end 56 of the uptake conduit 52 of the snorkel 50. A chamber 68 is located within the cylindrical housing 66 which acts as a pump chamber where the feed pump 70 can reside and supply high pressure water for delivery up the uptake conduit 52. This chamber 68 also has the snorkel port 69 passing thereinto which is coupled to the supply line 16 leading from the polymer gel emulsion reservoir 12, so that polymer gel emulsion can be supplied upstream of the feed pump 70.

The feed pump 70 resides within the cylindrical housing 66 just above the lower cover 62. This feed pump 70 is preferably provided with a motor 72 and a drive shaft 74. The motor 72 is most preferably a hydraulic motor powered by hydraulic lines 6 to cause the drive shaft 74 to rotate. The motor 72 could be an electric motor or other motor (other than hydraulic) in alternative embodiments.

An impeller 76 is coupled to the drive shaft 74, shown in this embodiment as a pair of angled impeller blades of a generally axial variety configured to efficiently impact the water and drive the water W up the uptake conduit 52 and pressurize the water W sufficient to cause the water W to climb all the way up to the tank 20. The impellers 76 could be provided in different numbers other than two and could be provided in various different geometries such as a more centrifugal geometry or hybrid of axial and centrifugal.

The feed pump 70 is preferably of a dynamic variety so that the feed pump 70 not only sufficiently pressurizes the water W to cause the water W to pass up to the tank 20, but also to sheer polymer gel emulsion supplied upstream of the pump with the water W, so that the polymer gel emulsion can be fully activated and uniformly mixed with the water W. In this way, when the water W arrives at the tank 20 it includes a homogenous distribution of activated polymer gel emulsion therein. The snorkel port 69 which delivers the polymer gel emulsion is preferably configured to be selectively supplied or not supplied with polymer gel emulsion, such as through a control valve operable by an operator onboard the aircraft 2. When not supplying polymer gel emulsion, the feed pump 70 merely delivers water W without polymer gel emulsion up to the tank 20.

While the preferred embodiment of this invention utilizes fire fighting additives in the form of polymer gel emulsion, such polymer gel emulsion materials may come in a variety of different formulations and styles which some individuals may consider to be a form of polymer gel emulsion or may dispute such a characterization. The term "polymer gel emulsion" should be read broadly to encompass any materials which a significant portion of the industry would consider to be characterizable as a polymer gel emulsion, or polymer gel material of some other type. Furthermore, it is conceivable that fire fighting additives which would not generally be considered to be a polymer gel emulsion, but which benefit from being added to water, could be substituted into the system 10 of this invention as an alternative.

The impeller 76 of the feed pump 70 is preferably supported at upper and lower ends by bearing bars 78 which span the cylindrical housing 66. These bearing bars 78 hold the impeller 76 in an axial orientation and allow water W to pass around the bearing bars 78 and past the impellers 76, for supply of the water W up the intake conduit 52. The impeller 76 is caused to rotate (about arrow E of FIGS. 3 and 4) through action of the motor 72, causing water W to flow into the intake 60 (along arrow A of FIG. 1) and up to the tank 20. The water W then enters the tank 20 (along arrow B of FIG. 9). Polymer gel emulsion or other fire fighting additive is optionally added to the water W adjacent the feed pump 70 (along arrow C of FIG. 4) so that flow into the tank 20 can be either just water W or a combination of water W and fire fighting additives such as polymer gel emulsion.

With particular reference to FIGS. 5-9, particular details of the tank 20 and polymer gel preparation equipment provided within and adjacent the tank 20 are described, according to this preferred embodiment. The tank 20 is preferably a rigid enclosure fixed to the aircraft 2, preferably just below a cabin thereof, but conceivably contained within a cabin or other frame of the aircraft 2. This tank 20 is preferably centered on the main propeller axis of the aircraft 2 or otherwise aligned with a center of mass and center of lift for the aircraft 2. The tank 20 is preferably rigid, but could conceivably be to some extent flexible or collapsible.

The tank 20 includes an enclosure 22 defining a perimeter of the tank 20 which in the embodiment depicted is generally rectangular in side and front elevation views and generally rectangular in plan view. A rectangular floor 24 defines a lowermost portion of the enclosure 22. A sump recess 26 extends below the floor 24 at one portion of the floor 24 adjacent the pump 30, to most efficiently allow water W within the tank 20 to be fed to the pump 30 when desired. The floor 24 also includes one water W exit in the form of at least one dump door 28, and preferably includes a pair of dump doors 28 therein which can be selectively opened for dumping of contents within the tank 20 when desired.

The pump 30 is preferably located within the tank 20 adjacent the sump recess 26. This pump 30 is coupled to a motor 31 which can be powered similar to the motor 72. For instance, hydraulic lines 4 can supply hydraulic fluid to power the motor 31. The motor 31 could alternatively be powered electrically or by other means similar to that of the motor 72. The pump 30 includes an inlet 32 opposite an outlet tube 34. The inlet 32 is on a lower side of the pump 30 and extends down into the sump recess 26 so that the pump 30 can effectively evacuate substantially all of the contents within the tank 20, by pulling the water W into the inlet 32 of the pump 30 (along arrow E of FIGS. 10 and 11).

Figure 10:
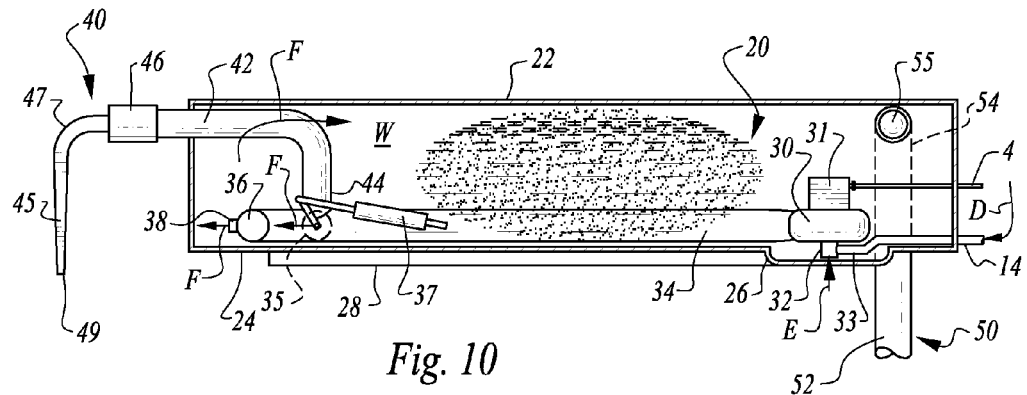
FIG. 10 is a full sectional view similar to that which is shown in FIG. 7, but with the tank shown in a recirculating mode with a pump within the tank being utilized to recirculate water therein and potentially to add fire fighting additive such as polymer gel emulsion into water within the tank.

A tank port 33 is located between the inlet 32 and the pump 30 so that polymer gel emulsion or other fire fighting additives can be added to water W drawn into the pump 30 when desired (along arrow D of FIG. 10). The pump 30 is preferably of a dynamic type, such as with a centrifugal or axial impeller therein to both pressurize the water W passing therethrough and sheer any polymer gel emulsion passing therethrough, such as from the tank port 33.

The outlet tube 34 could directly feed a discharge 40 or could be merely provided to recirculate back into the tank 20, but preferably can do both by feeding a valve 35 which can selectively either feed water W to the discharge 40 or water W back into the tank 20. In particular, the valve 35 is adjustable by an actuator 37 (along arrow G of FIG. 11) to either a first discharge path output leading to the discharge 40 or to a second return flow path output leading to a manifold 36. This manifold 36 splits water flow into multiple outlets which each preferably include jets 38 at tips thereof to evenly distribute and energetically discharge at high velocity the water W within the tank 20 (along arrow F of FIG. 10), such as for thorough mixing of contents within the tank 20.

When the valve 35 is configured to feed the discharge 40, the water flows through a junction 44 and then through a flow line 42 (along arrow H of FIG. 11) leading through a tank wall interface 46 and then on to a nozzle 45 or other tank exit separate from the dump doors 28. This nozzle 45 preferably is initially horizontal and then extends about a bend 47 to extend substantially vertically downward to a tip 49. The nozzle 45 preferably tapers as it extends towards the tip 49 so that a small cross-sectional area is provided for an opening at the tip 49 through which a high velocity focused fan I of water W is delivered from the nozzle 45 and down to an area L to be treated with water and/or fire fighting additive such as activated polymer gel emulsion.

While the pump 30 is preferred to provide at least the function of energizing flow of water W out of the discharge 40, and optionally providing for recirculation within the tank 20, it is conceivable that the pump 30 could be avoided. For instance, without the pump 30, the tank 20 could still utilize a water W exit in the form of the dump doors 28. It is also conceivable that the tank 20 could be configured to maintain a pressure above atmospheric pressure and the feed pump 70 could be sufficiently powerful that water W would be delivered up to the tank 20 and still under pressure within the tank 20. Pressure either for recirculation of water W within the tank 20 and/or for enhanced velocity flow out of the discharge 40, including the nozzle 45, could be facilitated by such an overpressure tank 20.

Most preferably however, the pump 30 is provided, both so that the feed pump 70 does not need to develop residual pressure for containment within the tank 20, and so that the tank 20 need not be configured as a pressure vessel, and also to provide a secondary location where water can be separately recirculated and also fire fighting additive, such as polymer gel emulsion, can be effectively sheered and activated when added to the water W. Furthermore, with the valve 35, the pump 30 can be utilized either for recirculation within the tank 20 or to make more energetic the delivery of water from the tank 20 through the discharge 40 and nozzle 45.

Also, the tank pump 30 allows for an operator to control when the fire fighting additive, such as polymer gel emulsion, is added to the water. The following scenarios are thus described. In one mode of operation, the feed pump 70 draws water W up into the tank 20 through the snorkel 50 and the snorkel port 69 is opened so that polymer gel emulsion is drawn into the water W and activated by the feed pump 70, so that activated polymer gel is added to the water W contained within the tank 20. The tank 20 contains the water and polymer gel emulsion as the aircraft 2 travels to a fire fighting location and the water and activated polymer gel can then either be discharged through the nozzle 45, through power supplied by the pump 30, or can be dumped through the dump doors 28. If required, such as due to the amount of time the aircraft 2 is in transit, the pump 30 could in the interim be operated intermittently (or continuously) to provide mixing of the water and polymer gel emulsion or other fire fighting additive within the tank 20, to ensure that a homogenous mixture is maintained. Furthermore, such pump 30 operation provides the added benefit of further sheering the polymer gel emulsion should its passage through the feed pump 70 not fully achieve such sheering and activation.

In a second mode of operation, the snorkel port 69 is shut off and the feed pump 70 at the intake 60 of the snorkel 50 draws water W up into the tank 20 without any polymer gel emulsion or other fire fighting additive added to the water W. The tank 20 thus carries only water W initially. This water W could be dumped through utilization of the dump doors 28. This water W could also be supplied in a directed fashion by utilization of the pump 30 to supply pressurized water through the discharge 40 through the nozzle 45 down to an area L to be wetted, such as directly onto fire N (FIG. 11) or onto an area to be protected from advancing fire N. Such a configuration could also be utilized to supply water W in circumstances other than fire fighting where delivery of water W from an aircraft 2 is desired.

Such a mode of operation has the advantage of saving the polymer gel emulsion or other fire fighting additive until it is intended to be used. If a load of water is drawn into the aircraft 2 and it later is determined that it is not required, the tank 20 is only containing water W and can be discharged at any time and location with less concern for any resulting hazard. Furthermore, various fire fighting scenarios may call for different amounts of polymer gel emulsion (or other fire fighting additive) to be added which might not be determined until the fire fighting location is being approached by the aircraft 2. In this mode of operation, the operator can determine how much polymer gel emulsion to add to the water W after the water W load has been drawn into the tank 20, for optimum performance.

In a variation on this mode of operation, when it is apparent that polymer gel emulsion or other fire fighting additive should be added to the water W, the pump 30 is activated and the tank port 33 is opened so that polymer gel emulsion (or other fire fighting additive) is added into the water W upstream of the pump 30 and the polymer gel emulsion is sheered and combined with the water W within the outlet tube 34 downstream of the pump 30. This water W with activated polymer gel emulsion could be immediately directed through the discharge 40 to the nozzle 45 through positioning of the valve 35 for such direct flow. As an alternative, a water with activated polymer gel emulsion could be routed through an appropriately configured valve 35 to the manifold 36 and back into the tank 20 for recirculation within the tank 20 (along arrow F of FIG. 10).

Figure 11:
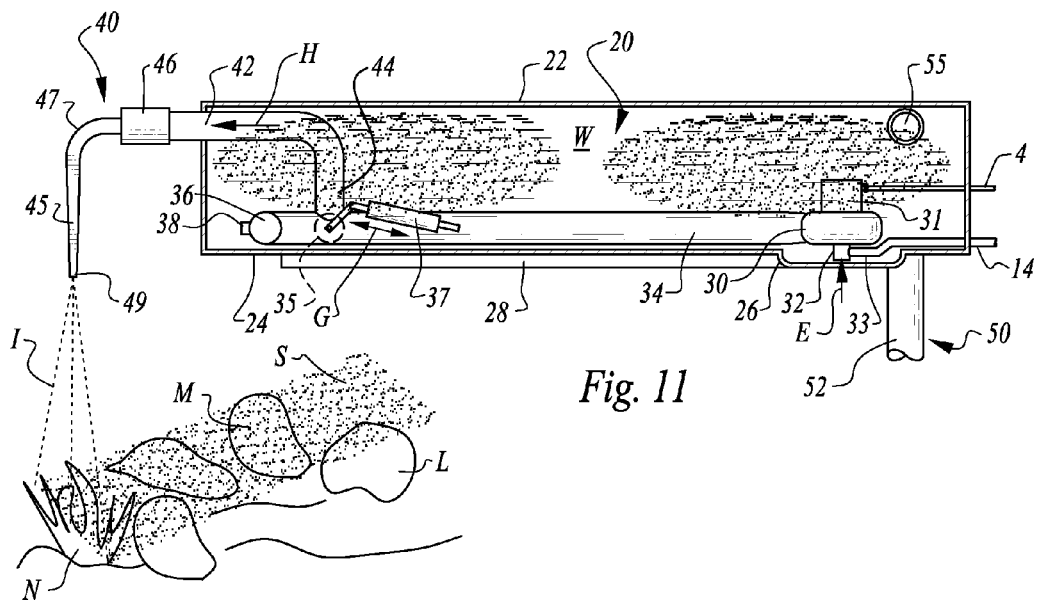
FIG. 11 is a side elevation view similar to that which is shown in FIG. 7, but with the tank configured to utilize the pump therein to supply pressurized water (with or without fire fighting additives such as polymer gel emulsion) through a nozzle discharge to an area to be treated in fire fighting.

Valve actuator 37 extension or contraction (along arrow G of FIG. 11) allows for selection of either recirculating/mixing flow along arrow F (FIG. 10) or nozzle flow through the valve 35 (along arrow H) for discharge as nozzle spray I. As depicted in FIG. 8, aircraft 2 motion (along arrow J) causes the nozzle spray I to taper slightly rearwardly. A stripe S of water W and fire fighting additive (such as activated polymer gel emulsion) produces the stripe S and results in a mat M of treated vegetation which is less susceptible to the ravages of fire N than untreated vegetation L. Fire N could also conceivably be directly sprayed (FIG. 11). If the water W is to be dumped, such action occurs through the dump doors 28 (along arrow K of FIG. 12). A width of the stripe S can be increased by raising the elevation of the aircraft 2 above the area L to be treated (and vice versa). A concentration of the stripe S can be increased by decreasing aircraft speed (along arrow J), and vice versa. Alternatively, an adjustable nozzle 40 under control of an operator could be utilized.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A fire fighting water additive preparation system for an aircraft, comprising in combination:
    a snorkel extending down from an upper end to a lower end, the snorkel including an elongate hollow interior extending from said upper end to said lower end for transport of water from said lower end to said upper end;
    a water intake adjacent said lower end of said snorkel, said water intake including a feed pump sufficiently close to said lower end to cause water to flow up through said snorkel;
    a tank located adjacent said upper end to receive water supplied from said snorkel;
    a fire fighting additive reservoir;
    a water exit from said tank for delivery of water and a fire fighting additive to an area to be protected from fire;
    a supply line from said fire fighting additive reservoir to a port, said port located between said water intake adjacent said lower end of said snorkel and said water exit from said tank, said port configured to add the fire fighting additive to the water before the water with fire fighting additive is released from said water exit; and
    wherein a tank pump is located within said tank, said tank pump having an inlet in a lower portion of said tank and an outlet on a side of said pump opposite said inlet.

2. The system of claim 1 wherein said fire fighting additive reservoir includes a polymer gel emulsion reservoir.

3. The system of claim 1 wherein said snorkel upper end is coupled to said tank through a check valve oriented to allow water flow from said snorkel upper end into said tank, but to substantially prevent flow from said tank back into said snorkel.

4. The system of claim 1 wherein said port is located upstream of said tank pump.

5. The system of claim 4 wherein said tank pump is a dynamic pump with a rotating impeller configured to impart sufficient sheer on the fire fighting additive in a form of polymer gel emulsion, to cause the polymer gel emulsion to be activated.

6. The system of claim 1 wherein said outlet of said tank pump has a valve thereon selectable to route water downstream of said pump selectably to either return into said tank or be routed to said water exit.

7. The system of claim 6 wherein said valve includes a return flow route downstream of said valve within said tank which includes a manifold leading to multiple jets within said tank to provide high velocity discharge of water within said tank and to mix water within said tank.

8. The system of claim 7 wherein said valve includes a discharge path separate from said return flow path leading to a nozzle, said nozzle located outside of said tank and with an open tip pointing substantially downward.

9. The system of claim 1 wherein said water exit includes at least one dump door in said tank openable to dump water from said tank.

10. The system of claim 1 wherein said water exit includes a nozzle with an open tip pointed substantially downwardly.

11. A fire fighting water additive preparation system for an aircraft, comprising in combination:
  a snorkel extending down from an upper end to a lower end, the snorkel including an elongate hollow interior extending from said upper end to said lower end for transport of water from said lower end to said upper end;
  a water intake adjacent said lower end of said snorkel, said water intake including a feed pump sufficiently close to said lower end to cause water to flow up through said snorkel;
  a tank located adjacent said upper end to receive water supplied from said snorkel;
  a fire fighting additive reservoir;
  a water exit from said tank for delivery of water and a fire fighting additive to an area to be protected from fire;
  a supply line from said fire fighting additive reservoir to a port, said port located between said water intake adjacent said lower end of said snorkel and said water exit from said tank, said port configured to add the fire fighting additive to the water before the water with fire fighting additive is released from said water exit;
  wherein said fire fighting additive reservoir includes a polymer gel emulsion reservoir; and
  wherein said port is located upstream of said feed pump.

12. The system of claim 11 wherein said feed pump is a dynamic pump generating sheer to activate polymer gel emulsion added to the water.

13. The system of claim 12 wherein said pump includes a rotating impeller rotating within a housing adjacent said lower end of said snorkel.

* * * * *